United States Patent [19]
Cook

[11] Patent Number: 5,415,822
[45] Date of Patent: May 16, 1995

[54] MANUFACTURE OF COMPOSITE EXTRUSIONS

[75] Inventor: John E. Cook, Aslockton, United Kingdom

[73] Assignee: Schlegel U.K. Holdings Ltd., Leeds, United Kingdom

[21] Appl. No.: 97,071

[22] Filed: Jul. 23, 1993

Related U.S. Application Data

[62] Division of Ser. No. 439,790, Nov. 21, 1989, abandoned.

[30] Foreign Application Priority Data

Nov. 21, 1988 [GB] United Kingdom ............... 8827180

[51] Int. Cl.⁶ ............................................. B29C 47/02
[52] U.S. Cl. ........................ 264/171; 156/244.12;
156/244.24; 156/244.27; 264/177.18; 264/177.19
[58] Field of Search ................. 264/177.17, 177.10, 264/177.16, 177.19, 177.20, 177.18, 149, 171; 156/244.11, 244.24, 244.19, 244.27, 244.12

[56] References Cited

U.S. PATENT DOCUMENTS

| | | | |
|---|---|---|---|
| 2,439,043 | 4/1948 | Evans | 156/244.12 |
| 3,068,136 | 12/1962 | Reid | 156/244.12 |
| 3,458,386 | 7/1969 | Shanok et al. | 156/244.12 |
| 3,706,173 | 12/1972 | Taylor | 156/244.27 |
| 4,042,741 | 8/1977 | Bright | 264/177.16 |
| 4,081,504 | 3/1978 | Wenrick et al. | 264/210.2 |
| 4,698,193 | 10/1987 | Bernitz et al. | 264/177.2 |
| 4,830,898 | 5/1989 | Smith | 264/177.2 |
| 5,013,379 | 5/1991 | Brooks et al. | 156/244.24 |

FOREIGN PATENT DOCUMENTS

| | | | |
|---|---|---|---|
| 57-26023 | 2/1982 | Japan | 264/177.1 |
| 60-31937 | 2/1985 | Japan | 264/177.1 |
| 60-99633 | 6/1985 | Japan | 264/177.1 |

*Primary Examiner*—Jeffery R. Thurlow
*Attorney, Agent, or Firm*—Cumpston & Shaw

[57] ABSTRACT

A method of forming a composite extrusion is disclosed wherein a main body portion (1) of the extrusion is first extruded from a thermosetting material, this body portion then being heated so as at least partly to cure it, the main body portion then being passed at high temperature through a further extruder where a thermoplastics material (8) is extruded onto one or more surfaces of the main body portion (1), the subsequent composite extrusion then being cooled and formed into its final shape. It is important that the combining step be undertaken at a temperature high enough to cause the thermoplastics material to bond to the thermosetting material and while it is simplest for the thermoplastics material to be on an outer surface of the composite extrusion, it is possible for it to be located within the thermosetting material by extruding the thermosetting material in an "opened out" state and then after extruding the thermoplastics and while the extrusion is still hot, folding in edge regions of the main body to overlie the thermoplastics material and bond thereto. The thermoplastics material may be of a special colour, may be embossed, and if it is located within the thermosetting material in the end product, may be stiffer than the latter. The invention also extends to the extrusions themselves.

7 Claims, 5 Drawing Sheets

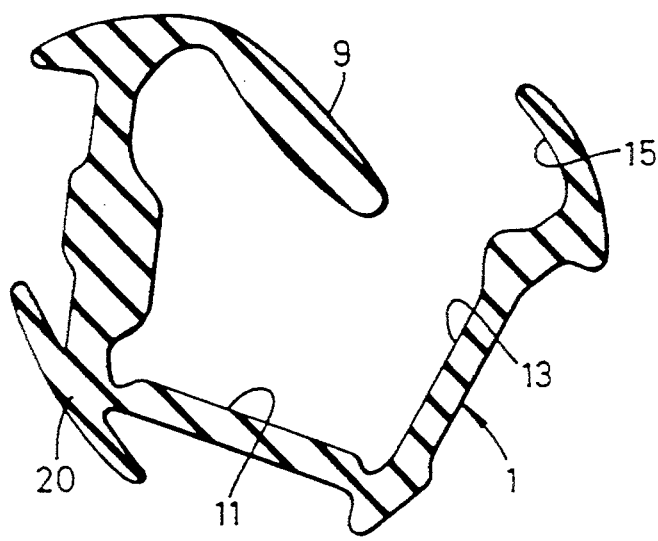
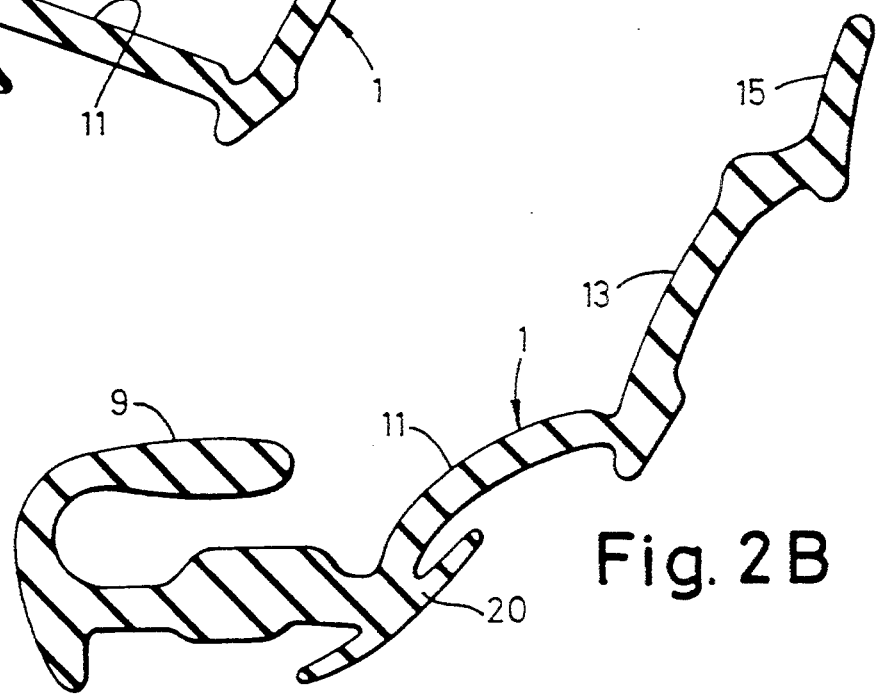
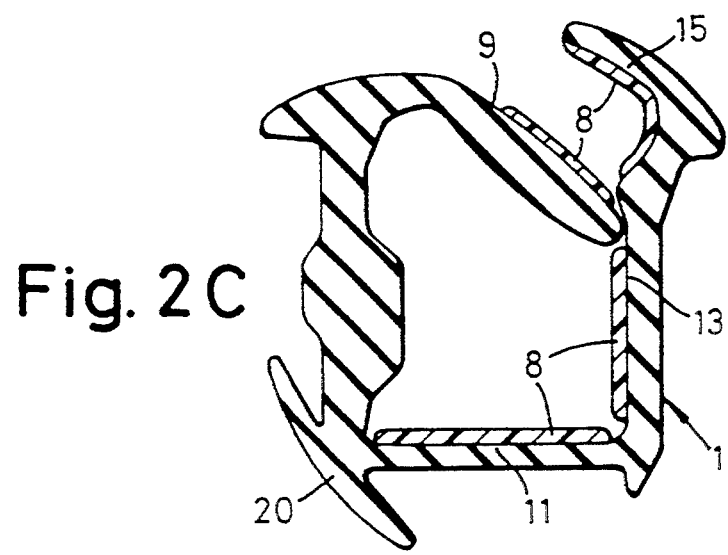

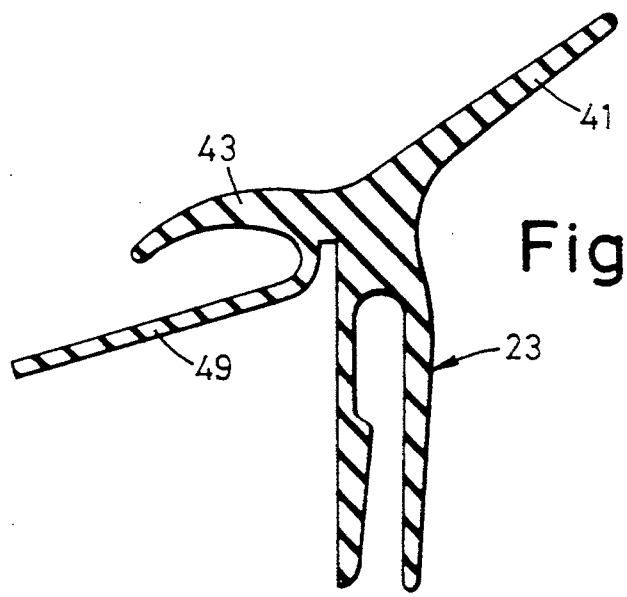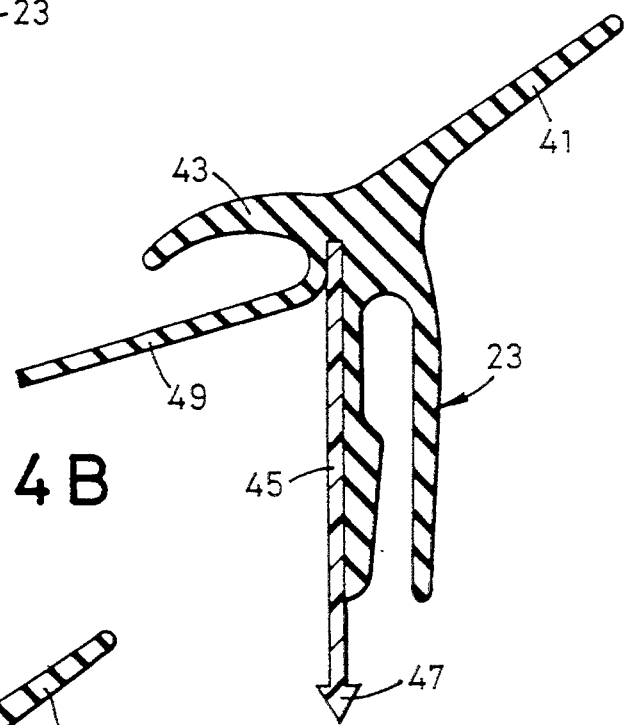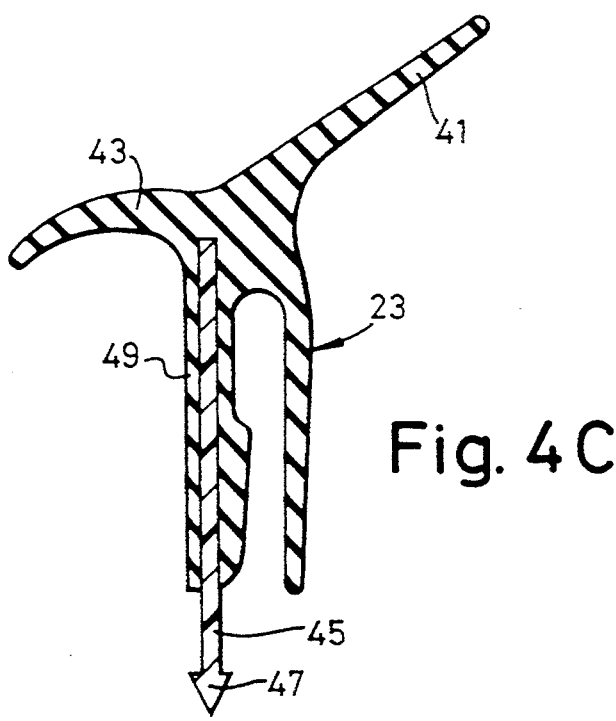

MANUFACTURE OF COMPOSITE EXTRUSIONS

This is a divisional of application Ser. No. 07/439,790, filed on Nov. 21, 1989, now abandoned.

FIELD OF THE INVENTION

The present invention relates to methods of manufacturing composite extrusions and to extrusions manufactured by the methods. In such extrusions, a portion of the main body of the extrusion is comprised of an extruded thermosetting polymer and a further portion of the extrusion comprises a thermoplastic polymer bonded to the thermosetting material. The further portion may be a surface portion, or be located within the extrusion.

BACKGROUND OF THE INVENTION

In the motor and building industries, it is common practice to extrude sealing sections either from a black thermosetting polymeric material which incorporates one or more fillers to reduce the cost of the extrusion or from a more expensive thermoplastics material. However, in each case, there is often a requirement for the extrusion to have its characteristics changed. For example, in order to stiffen up the polymeric material of a U-sectioned edge trim or door seal, a metallic carrier is incorporated within the extrusion. Alternatively (or additionally) a second polymeric material can be co-extruded with the first polymeric material. This is relatively easy with expensive thermoplastics polymers but not with thermosetting polymers. Hence, there is a requirement for rubber technologists to produce special rubbers which are compatible with and therefore competitive with the harder more expensive thermoplastics materials. For example, there is a requirement in both the motor and building industries for rubber extrusions to be provided which colour match motor car paintwork and/or upholstery in the one case and which colour match window frames and the like in the other, or which have a special decorative surface, or which have surface characteristics different from those of the main body of the extrusion.

It is also known to stiffen or reinforce internally thermosetting elastomer extrusions by using metal carriers. These are extremely satisfactory, but the metallic carrier is heavy and can rust, and is relatively expensive to manufacture.

There is therefore an ongoing requirement for providing a more satisfactory, less expensive product.

In GB-A-2109042 a rubber extrusion is disclosed wherein a coating of low friction polymer such as PTFE is applied to the surface of the extruded section by means of adhesive or spraying to reduce the frictional resistance of the extrusion. With many surface coatings, which are normally very thin, it is difficult and sometimes impossible to maintain a quality check on the extrusion and it is almost impossible to measure with instruments whether the coating is present or not. Furthermore, whether the surface layer be applied by means of spraying or adhesive, it is extremely difficult to obtain a satisfactory bond between the rubber and the surface coating, and the sprayed on coating is liable to cracking and crazing in use, whereas the adhered layer is liable to peeling off.

It is also known from GB-A-1545511 to co-extrude two different rubber materials so that the outer surface of the extrusion is different from the main body of the extrusion. For example, the main body of the extrusion may be formed of a relatively inexpensive rubber polymer and the surface of a different rubber polymer having desired characteristics. Unfortunately, however, such extrusions are difficult to produce and when the surface polymer is to be of a different colour from the main body of the extrusion, it is almost impossible to maintain colour quality and to match the colour with another colour because of the tendency for co-extruded rubber polymers to run together and merge. In any event, it is extremely difficult to clean out the extrusion apparatus satisfactorily when a change of colour is required and to co-extrude a particular coloured rubber polymer onto a basically black thermosetting polymer base.

In U.S. Pat. No. 4,513,044, a coloured rubber door seal is disclosed comprising a sealing portion of sponge rubber and a U-shaped trim or edge gripping portion of solid rubber with a metal carrier insert, there being a coloured solid rubber layer overlying the trim portion and a part of the sealing portion. The problems associated with GB-A-1545511 are also associated with this product.

It is also known from EP-A-0200618 and EP-A-0124955 to extrude thermosetting polymeric materials in the form of window channels or sealing strips and to incorporate into the thermosetting elastomer material a second polymeric material of low coefficient of friction which migrates to the surface of the extrusion to reduce its surface coefficient of friction. Such products, however, suffer from the disadvantage that they are principally formed of relatively expensive thermoplastics material.

In U.S. Pat. No. 4,538,380 a weatherseal is disclosed comprising a semi-rigid base member of polypropylene, a tubular sealing member of thermoplastic elastomer and a thin film of polypropylene, or a blend of polypropylene and thermoplastic elastomer, capping all or part of the tubular sealing member. The product is formed as a single extrusion, and the film provides a low friction contact surface to the thermoplastic elastomer sealing member which is resilient and compliant over a wide range of temperatures. Again, the extrusion is formed of expensive thermoplastic materials.

U.S. Pat. No. 4,676,856 discloses an extruded door seal which incorporates a thermoplastics polymeric carrier in place of the traditional metal carrier, around which a thermosetting polymer (rubber) is extruded. After extrusion the product is heated to cure the rubber and is then cooled so that the carrier becomes brittle so that it can be fractured along predetermined fracture lines to impart flexibility into the product, whereupon the product is heated in such a way that the carrier becomes soft again so that it can be formed into its required U-shape. Although the door seal disclosed in this specification is primarily formed of rubber, it is expensive to manufacture due to the several stages in the manufacturing process.

In EP-A-0209453, a method of making a composite extrusion is disclosed which comprises feeding into an extrusion die a thermoplastics material and a thermosetting material which have different extrusion temperatures, whereupon the resultant profile is cooled to below the softening point of the thermoplastics material, whereupon the thermosetting material is vulcanised.

In U.S. Pat. No. 4,537,825 and GB-A-1423541, there are disclosures of bonding thermosetting and thermoplastics materials together, in which a vulcanised blended thermosetting material has a thermoplastics elastomeric blend fused therewith. Because both polymers are blends, it is believed that a chemical bond occurs between the two polymers. The blended polymers are expensive and time consuming to produce.

In JP-A-49130470, there is a disclosure of coating a rubber tube with a thermoplastic blended co-polymer. The methods of achieving a satisfactory bond using extrusion techniques are not detailed.

It is also known to manufacture sealing strips with a semi-rigid base member formed for example of impregnated paper by means of which the strip is secured for example to a window frame, there being a flexible polyurethane foam bead projecting centrally from the base member with the whole being encapsulated in a sheath of polyethylene film by a continuous moulding process. This product is marketed under our Registered Trade Mark Q-lon.

SUMMARY OF THE INVENTION

The present invention seeks to provide methods of manufacturing composite extrusions which are suitable for use as a door or boot seal in the motor industry or as a seal or window channel either in the building or motor industry, or for other purposes and which is principally formed of a vulcanised polymeric material (thermosetting/cross linked/rubber) (hereinafter called thermosetting polymeric material), which is considerably less expensive than the majority of suitable thermoplastics polymeric materials (plastics). By virtue of the invention, it is possible to produce a wide range of extrusions relatively cheaply but which can either have surface properties of the more expensive extrusions formed of thermoplastic material and/or which can have its properties changed without having to incorporate a metal carrier in the extrusion.

According to one aspect of the present invention, we provide a method of forming a composite extrusion having a main body portion consisting at least principally of one or more thermosetting polymeric materials and at least one other portion consisting of a thermoplastic polymeric material, comprising the steps of passing said one or more thermosetting materials through an extruder to form said main body portion, at least partially curing said body portion, maintaining said body portion at an elevated temperature, passing the same, while hot, through a further extruder and extruding said thermoplastic material onto a portion thereof, thereby bonding the two materials together, and then cooling the composite extrusion, and forming it into the desired cross-sectional shape.

Also according to the present invention, we provide a composite extrusion comprising a main body formed at least principally of an extruded thermosetting polymeric material with at least one portion of the extrusion being formed of a thermoplastic polymer material bonded to the thermosetting material using a method as described above, wherein the thermoplastics material is on a surface of the composite extrusion, and of a chosen colour.

Preferably, immediately after the thermosetting extrusion is passed through a hot curing station, to partially cure it, it is temporarily formed into a special shape for receiving thermoplastics material, and while it is still hot from the curing step and only partially cured, it has the thermoplastics material extruded onto it.

If the thermoplastics material is to be provided on a surface of the thermosetting material, then the exposed surfaces of the thermoplastics material must be cooled, whereupon the composite extrusion is passed through a forming die and the extrusion is cooled further so as to form it into its final cross-sectional shape. Alternatively, if the thermoplastics material is to be located other than on the surface of the thermosetting material, then immediately after the second extrusion operation, and prior to any cooling step, one or more edge regions of the thermosetting material are folded into contact with the exposed surface of the thermoplastics material, so that they will bond thereto, whereupon the extrusion is shaped and formed and cooled.

Preferably, the temperature within the extruder for the thermosetting material is within the range of 40° C. to 100° C. and the temperature within the curing bed is within the range of 180° C. to 250° C., with the extrusion exiting from the bed at a temperature within the range of 150° C. to 250° C.

Preferably, the temperature within the extruder for the thermoplastic material is within the range of 140° C. to 250° C. By the time the composite extrusion passes out of the forming and cooling die, the temperature of the extrusion should be below about 40° C.

It is obviously important that the thermosetting polymeric materials used in the composite extrusion are compatible with the thermoplastic polymeric materials. Some of the thermoplastic materials which can be used are polyethylene, polypropylene, or ethylene vinyl acetate. These can be modified with EPDM or butyl compounds and cross-lined by peroxides or moisture or UV and other systems. The usual range of fillers and extenders like calcium carbonate, mica, talc and plasticisers can also be incorporated therein. Suitable vulcanised or cross-linked (thermosetting) polymeric materials are EPDM, EPDM modified with chorobutyl, nitrile modifed EPDM, polyethylene, ethylene vinyl acetate or polypropylene. The polyethylene, polypropylene or ethylene vinyl acetate can be modified with EPDM or butyl compounds and cross-linked by peroxides or moisture or UV and other systems; the polymers can include the usual range of fillers and extenders like calcium carbonate, mica, talk and plasticisers. It is preferred that the thermosetting material is a cured EPDM rubber and that the thermoplastics material is an EPDM modified polypropylene.

Several preferred embodiments of the invention are now described by way of example with reference to the accompanying schematic drawings, in which:

BRIEF DESCRIPTION OF THE DRAWINGS

FIG. 2A shows a typical extrusion of thermosetting material in the form it emerges from the extruder, and after it has been partly cured;

FIG. 2B shows the extrusion of FIG. 2A deformed ready for a surface layer of thermoplastic material to be extruded thereon;

FIG. 2C shows the final shape of the extrusion ready for use, after shaping and cooling, to provide a first embodiment of the invention;

FIGS. 3A to 3C, 4A to 4C, and 5A to 5C show, respectively, three stages in the formation of three different versions of an alternative embodiment of the invention.

DESCRIPTION OF THE INVENTION

Figure 1:
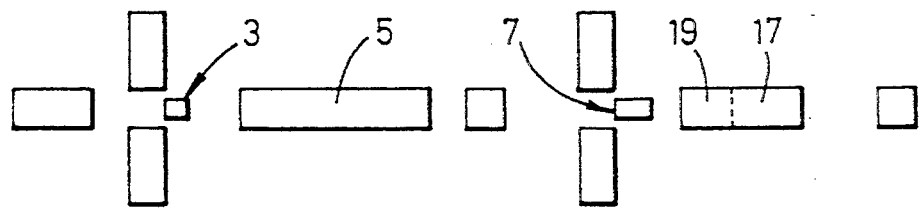
FIG. 1 is a block diagram showing the steps in the process of manufacture of a composite extrusion having a surface portion different from the main body of the extrusion.

Referring first to FIGS. 1 and 2, a strip 1 which will eventually become a vehicle window guide channel is extruded from a thermosetting polymeric material such as EPDM in a traditional "rubber" extruder 3 (the first extruder) to have the general shape as shown in FIG. 2A. This rubber extrusion step is carried out at a temperature in the range of about 80° C. to 150° C. using state of the art equipment and techniques. On emerging from the first extruder 3, the strip 1 is passed through a standard curing tunnel 5 where it is supported on a fluidised bed of hot glass beads; the vulcanised extrusion emerges from the tunnel 5 in a semi-cured state, and at a temperature within the range of 180° C. to 250° C.

The strip is then opened out into the shape shown in FIG. 2B and passed into a second extruder 7, where a thermoplastics material 8, ideally EPDM modified polypropylene, is extruded onto surface areas 9, 11, 13 and 15 of the still hot strip 1. Due to the residual heat of the thermosetting material of the strip 1, and due to the fact that the temperature of the thermoplastics material in the extruder 7 is in the range of 140° C. to 250° C., the thermosetting material of the strip 1 and the thermoplastics material 8 bond together.

Immediately on emerging from the extruder 7, the composite extrusion is passed through a cooling station 19 to partially cool the exposed surfaces of the thermoplastics material, so that the surfaces are no longer tacky, and the extrusion is then fed into a forming and cooling die 17, where it is folded from its "opened out" state of FIG. 2B into the shape shown in FIG. 2C. The extrusion is then held in this position, and cooled virtually to room temperature, so that it will be formed into its required final shape shown in FIG. 2C.

To use the strip, it is located in a groove in a vehicle door or door frame by a retention part 20, and is held by the walls of the groove in the position shown in FIG. 2C. The strip is designed to act as a guide for a sliding window, with the edge region of the glass being located between the strips of thermoplastics material 8 which are firmly bonded to the surfaces 9, 13 and 15, and its edge abutting the material 8 on the surface 11.

It will of course be appreciated that while the main body of the strip 1 is formed of a thermosetting black rubber material, the portions 8 are formed of a different thermoplastics material which can be of any desired colour (e.g. to colour match a vehicle's paintwork) and can have the more rigid, and more slippery porperties required to locate an edge region of a vehicle window. However, the portions 8 on the surfaces 9 and 15 will be biased into sealing engagement with the glass, due to the resilient nature of the strip 1 on which the portions 8 are supported.

Figure 6:
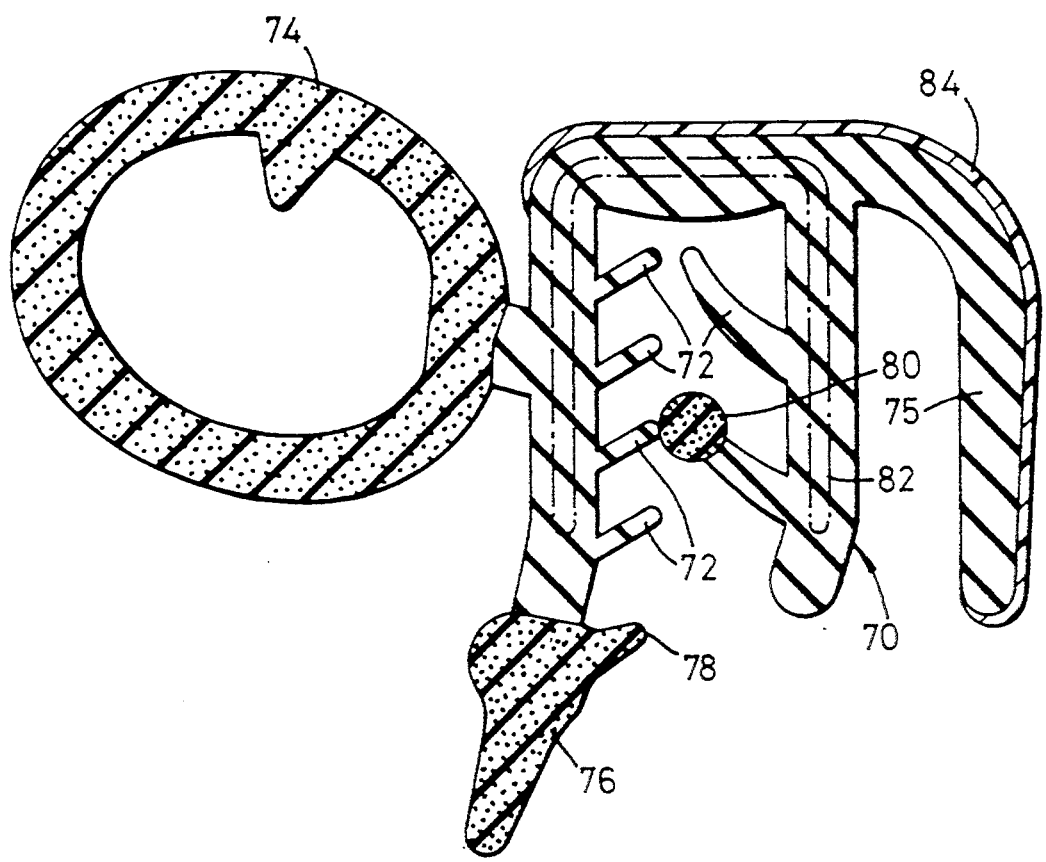
FIG. 6 is a cross-section through an alternative embodiment of composite extrusion.

It will be appreciated that the composite extrusion could be of a different cross-section such as shown, for example, in FIG. 6. In this embodiment of the invention, a generally U-shaped edge trim is formed in a modified first rubber extruder, the edge trim having a U-shaped body 70 formed of EPDM, SBR, a blend of the two, natural rubber, neoprene or another thermosetting material, the body having formed integral therewith a plurality of small and large flange gripper fins 72 of any desired number and configuration, a hollow sealing bulb 74, a flap seal 75, and a secondary seal 76 with subsidiary sealing fin 78. The bulb 74, seal 76 and fin 78 are formed of a foamed rubber in known manner, and the tip 80 of the outermost one of the larger of the fins 72 may also be foamed. Located within the U-shaped body is a metal carrier 82, which may be of known construction (e.g. knitted wire, or slotted or stamped metal). The technology to extrude the combined U-shaped edge trim with integral sealing bulb 74 is known and after it has been passed through a curing bed 5, the vulcanised rubber extrusion, while still hot, is then passed through a second extruder, so that a layer of thermoplastics material 84 can be extrusion coated onto what will be the exposed face of the edge trim.

The temperature in the rubber extruder should be in the region of 100° C., the curing bed can be a fluidized bed, or microwave oven, or salt bath, or hot air, at a temperature of around 205° C., and after being hauled from the first extruder and washed, it is passed through the second extruder where the thermoplastics material is extruded onto it at a temperature in the range of 120° C. to 180° C. The thermoplastics material can be of any desired colour, and after being cooled, it can be "post formed" to the required profile, and/or embossed if required. Furthermore, after cooling, a high gloss coating can be sprayed onto the thermoplastics material to improve its surface appearance, and its scuff resistance.

The thermoplastics material may be a blend of 90% Santoprene/10% polypropylene (or in any other ratio), or 100% Ethylene Vinyl Acetate (EVA), or a blend of the two.

Figure 3A:
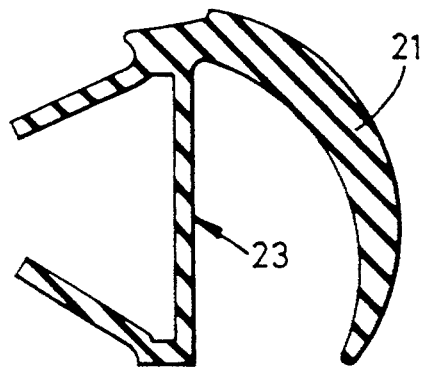
Figure 3B:
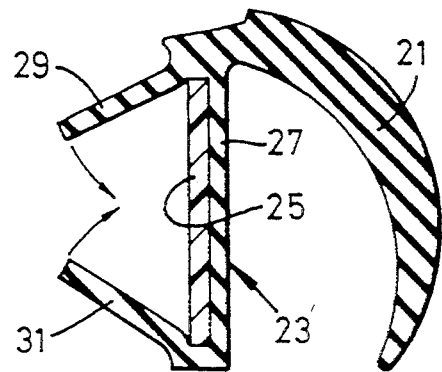
Figure 3C:
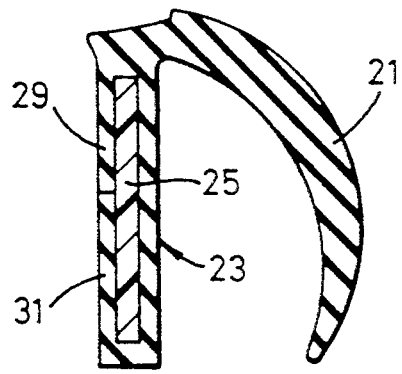

Referring now to FIGS. 3A to 3C, FIG. 3A shows an extrusion of a thermosetting material somewhat equivalent to that shown in FIG. 2A but of an entirely different product and having a flap seal 21 and a securing portion 23 which as is the case with the construction shown in FIG. 2A, is initially extruded from a thermosetting material in an "opened out" form. After being extruded in a conventional rubber extruder such as the extruder 3 shown in FIG. 1, the rubber extrusion is partly cured using a standard curing technique such as a curing bed 5, whereupon, as is the case in FIG. 2C, a thermoplastic elastomer reinforcement strip 25 is extruded onto a main part 27 of the securing portion 23, while the latter is still hot, so as to form a firm bond therewith using a second plastics extruder 7.

In contrast to the embodiment of the invention shown in FIG. 2C, the composite extrusion shown in FIG. 3B is then passed through a forming and cooling die 19 without first being cooled so as to cause arm portions 29 and 31 which are formed of thermosetting material to be moved from their opened out position shown in FIG. 3A and 3B to a folded in position in abutting relationship with the exposed surface of the thermoplastic material 25, as shown in FIG. 3C. The forming operation performed by the forming and cooling die 19 is performed at an elevated temperature prior to any cooling step so that the inner face at least of the arms 29 and 31 and the outer face of the thermoplastic material 25 will still be hot so that when the faces are brought into abutting relationship with each other, they will bond together. As the extrusion continues through the forming and cooling die, so the temperature of the die is reduced, thus cooling the composite extrusion to a temperature in the region of 40° C. so as to maintain the extrusion in the form illustrated in FIG. 3C. By selecting an appropriate polymer for the thermoplastic material 25, the characteristics of the securing portion 23 can be modified as required. For example, by choosing a polymer which at a temperature of about 40° C. is semi-rigid, the otherwise resiliently deformable securing portion 23 can be considerably stiffened.

Two alternative constructions of the second embodiment of the invention are illustrated in FIGS. 4A to 4C and 5A to 5C respectively and component parts of the extrusions shown in these Figures which correspond with component parts in FIGS. 3A to 3C bear the same reference numerals.

Referring first to FIGS. 4A to 4C, the seal shown therein really only differs from that of FIGS. 3A to 3C in that it has a flap seal 41 and a subsidiary flap seal 43 instead of the flap seal 21, and in that the main body 23 is generally U-shaped. A thermoplastic strip of material 45 is extruded onto the previously extruded body 23 of thermosetting material but, in this case, it extends beyond the body 23 and terminates in an enlarged locking head 47, and only one arm 49 is provided which is folded over the hot extruded strip of thermoplstic material 45 while it is still hot so as to form a bond therewith.

Figure 5A:
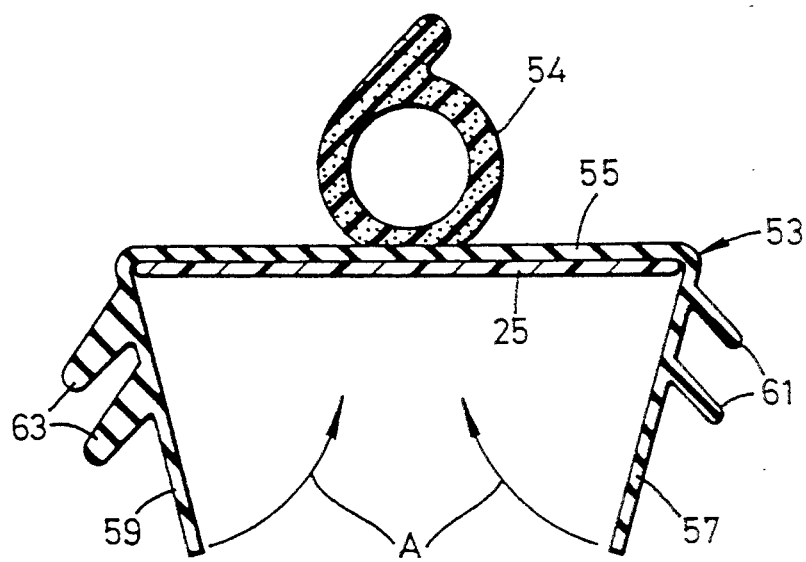
Figure 5B:
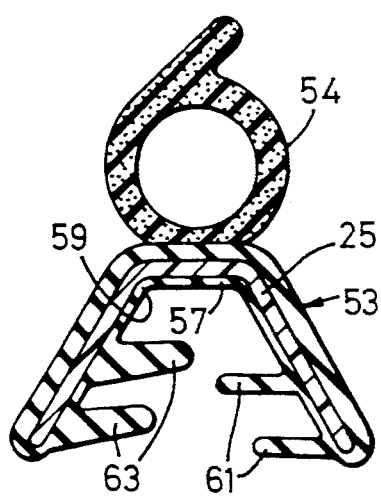
Figure 5C:
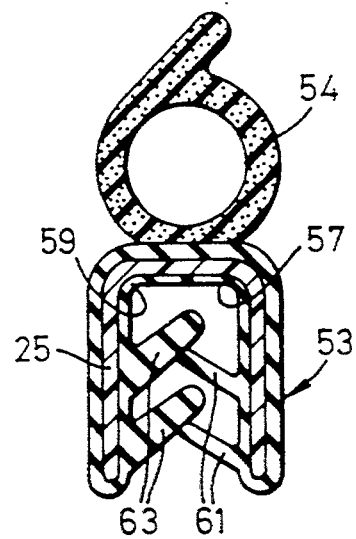

The extrusion shown in FIGS. 5A to 5C has a final shape as shown in FIG. 5C and is intended to be used as a combined edge trim and door seal for fitting on a flange around a door opening on a motor car. The extrusion has a generally U-shaped flange gripping body portion 53 formed of thermosetting polymeric material and a hollow sealing portion 54 also formed of a thermosetting polymeric material which may be softer than the material of the flange gripping portion 53. This can be achieved by using the same thermosetting material, but foaming it.

The first stage in the formation of the composite extrusion is not illustrated in the drawings, but it comprises the extruding of the thermosetting body portion 53 and sealing portion 54 in a single extrusion step using a first rubber extruder, but with the body portion 53 being in an opened out state and having a generally flat base 55, with arm portions 57 and 59 extending from the edge regions of the base portion 55 and extending at an angle of about 80° thereto, both on the same side of the base portion 55. A pair of spaced gripping fins 61 extends outwardly from the arm 57 and a further pair of spaced gripping fins 63 extends outwardly from the arm 59, the fins 63 being somewhat thicker and less deformable than the fins 61. The general shape of the first extrusion of thermosetting material is shown in FIG. 5A, but FIG. 5A shows the extrusion after it has been passed through a curing station and largely cured and after a strip of thermoplastic material 25 has been extruded onto the face of the flat base 55 so as completely to cover the face between the arms 57 and 59. This extrusion step is performed by a second, plastics extruder while the thermosetting material is still hot, so that the thermoplastic material 25 will bond to the face of the base 55 and is equivalent to the steps shown in FIGS. 3B and 4B of the previous versions of the invention.

Immediately after the thermoplastics material 25 has been extruded onto the face of the base 55 and while both materials are still hot, the arms 57 and 59 of thermosetting material are folded inwardly in the direction of the arrows A as shown in FIG. 5A until the inner faces of each arm abut the outer face of the thermoplastic material 25 and the free end portions of the arms 57 and 59 abut each other. Because the materials are still hot they will bond with each other.

Subsequent to this, the partially formed composite extrusion is passed through a forming and cooling die which progressively forms the extrusion into the shape shown in FIG. 5B and then on into the final shape shown in FIG. 5C. By choosing an appropriate thermoplastic material 25, which in the end product is totally encapsulated within thermosetting material of the flange gripping portion 53, a large degree of rigidity can be imparted to the flange gripping portion 53 in transverse planes through the flange gripping portion, thus maintaining the U-shape of the flange gripping portion and allowing it strongly to grip a flange to which it is fitted.

It will thus be appreciated that the various versions of the second embodiment of the invention which are illustrated in FIGS. 3A to 3C, 4A to 4C and 5A to 5C are provided with an internal reinforcement or stiffened carrier 25 which is non-metallic but which, by choosing the correct material, can have strengthening and stiffening properties normally associated with a metal carrier, but which does not have the undesirable properties of a metal carrier, namely a relatively high weight and a tendency to rust.

Instead of only partially curing the thermosetting extrusion, it can be normally cured and reeled, and in a subsequent operation, it can be heated to a temperature within the range of about 180° C. to 250° C., and then be passed into the further extruder to have the thermoplastic material extruded onto it; the final steps would then be undertaken in a similar manner to those described with reference to the drawings. It has been found that a satisfactory bond can be achieved by taking a reeled thermosetting extrusion extruded up to two weeks earlier, provided it is heated adequately before passing it into the second, plastics extruder.

It will thus be appreciated that this invention enables a rubber extrusion to be matched to the interior of an automobile or the exterior paintwork of an automobile, or to the interior or exterior decor of a building by extruding a thermoplastics material onto its surface. In order to obtain the long term performance characteristics, such as ozone resistance, low temperature properties and compression set on automobile, domestic or industrial weatherstrips, a cross-linked thermosetting polymeric material is necessary for the main body of the weatherstrip.

Traditionally, extruded rubber seals have had to be bonded by use of adhesives to a coloured thermoplastic extrusion, which matches the interior and exterior of an automobile or building. Such combination seals have to pass through three discrete and different production processes, namely rubber extrusion, plastic extrusion, and combining the two with adhesives. Each process generates wastage and uses labour, and rubber extrusions are difficult to bond to thermoplastic materials and have therefore to be prepared to render them compatible. Some of the procedures are:

1. Surface grinding to afford a clean surface on the rubber extrudate.

2. Flame treating the surface of the rubber to change the polarity.

3. Corona treatment of the rubber, plastic or both surfaces.

4. Use of two-part urethane adhesives, high melt point, hot melt adhesive, or cross-linking hot melt adhesives to adhere the two substrates.

The invention described eliminates several stages of the combining process through the ability to extrude a decorative thermoplastic film directly onto a rubber extrudate, thereby giving a cheaper product, simpler manufacturing process, and reduced floor space useage.

Such seals are more economical than fabric covered seals, due to the elimination of expensive fabrics.

In the second embodiment of the invention, it is possible to form the extrusion so that the thermoplastics material is located internally of the thermosetting material, which by choice of a suitable thermoplastics material, can act as a stiffener, and replace the traditional metal carrier provided for stiffening purposes.

When the thermoplastics material is to be located on the surface of the composite extrusion, it is preferred that its stiffness or hardness (or flexibility) should approximately match that of the thermosetting material, and be in the region of Shore—A 70° to Shore—A 55°. However, when it is to be located within the thermosetting material in the end product, it would normally be stiffer or harder than the thermosetting material, and could have a hardness in the region of Shore—D 50° to Shore—D 60°.

It will of course be understood that the various embodiments of the present invention have been described above purely by way of example, and modifications of detail can be made within the scope of the invention.

I claim:

1. A method of forming a composite extrusion into a desired final cross-sectional shape having a main body portion consisting of at least one or more thermosetting polymeric materials and at least one other portion consisting of a thermoplastic polymeric material, comprising the steps of passing said one or more thermosetting materials through an extruder at a temperature between about 40° to 100° C. to form said main body portion, at least partially curing said body portion by passing it through a curing station and maintaining said body portion at a temperature between about 180° and 250° C., passing said body portion through a further extruder at a temperature between about 140° to 250° C., and extruding said thermoplastic material at a temperature between about 120° and 180° C. onto a portion thereof, thereby bonding the two materials together, and then cooling the composite extrusion, and forming it into the desired final cross-sectional shape.

2. A method according to claim 1, wherein the extrusion exits from the curing stage at a temperature within the range 150° C. to 250° C.

3. A method according to claim 1, further comprising the step of temporarily forming said partially cured body portion into a desired shape for receiving said thermoplastic material prior to the extrusion thereof.

4. A method according to claim 1 in which said thermoplastic material is provided on one or more surfaces of said composite extrusion and including the steps of extruding onto one or more surface regions of said thermosetting material said thermoplastics material, and wherein the step of cooling said composite extrusion comprises first cooling the exposed surfaces of said thermoplastic material, and the forming step comprises passing said composite extrusion through a forming die, and then cooling said composite extrusion further and at the same time forming said composite extrusion into its final cross-sectional shape.

5. A method of forming a composite extrusion into a desired final cross-sectional shape having a main body portion consisting of at least one or more thermosetting polymeric materials and at least one other portion consisting of a thermoplastic polymeric material, in which said thermoplastic material is provided other than on a surface of said composite extrusion, comprising the steps of passing said one or more thermosetting materials through an extruder at a temperature between about 40° to 100° C. to form said main body portion, at least partially curing said body portion by passing it through a curing station and maintaining said body portion at a temperature between about 180° and 250° C., temporarily forming said partially cured body portion into a desired shape for receiving said thermoplastic material prior to the extrusion thereof, passing said body portions while hot through a further extruder at a temperature between about 140° to 250° C., and extruding the thermoplastic material at a temperature between about 120° and 180° C. onto a surface region of said extruded thermosetting material, folding one or more edge regions of said thermosetting material into contact with the exposed surface of said thermoplastic material so that they will bond together, prior to any cooling step, passing said composite extrusion through a forming die, and forming it into the desired final cross-sectional shape.

6. A method according to claim 4 wherein the steps of passing said composite extrusion through a forming die and the cooling step comprises passing said extrusion through a forming and cooling die.

7. A method according to claim 6 wherein the composite extrusion exits from the forming and cooling die at a temperature below about 40° C.

* * * * *